United States Patent

Hopkins

[11] 3,806,973
[45] Apr. 30, 1974

[54] TAP DRIVER
[75] Inventor: David Alan Hopkins, Detroit, Mich.
[73] Assignee: The Valeron Corporation, Oak Park (Detroit), Mich.
[22] Filed: May 25, 1972
[21] Appl. No.: 256,679

[52] U.S. Cl. ............. 10/129 R, 10/141 H, 10/89 F
[51] Int. Cl. ........................ B23g 1/46, B23b 31/00
[58] Field of Search.. 10/89 F, 89 H, 129 R, 141 H; 64/23; 279/16; 308/6 C

[56] References Cited
UNITED STATES PATENTS

| | | | |
|---|---|---|---|
| 2,371,330 | 3/1945 | Irstad | 279/16 |
| 2,772,094 | 11/1956 | Jamilkowski et al. | 279/16 |
| 2,979,147 | 4/1961 | Naumann | 308/6 C |
| 3,113,329 | 12/1963 | Andres et al. | 10/129 R |
| 3,178,739 | 4/1965 | Plummer et al. | 10/129 R |
| 3,143,867 | 8/1964 | Anderson | 64/23 |
| 3,220,030 | 11/1965 | Supernor | 10/129 R |
| 3,552,806 | 1/1971 | Weasler et al. | 308/6 C |
| 1,918,108 | 7/1933 | Jonkhoff | 64/23 |
| 2,981,570 | 4/1961 | White | 308/6 C |

Primary Examiner—Charles W. Lanham
Assistant Examiner—E. M. Combs
Attorney, Agent, or Firm—Farley, Forster and Farley

[57] ABSTRACT

The invention comprises an improved axially compensating tap driver having a recirculating anti-friction bearing engagement between axially telescoping portions. The bearing race comprises an elongated endless race directly machined in the cylindrical surface of the male portion and a longitudinal channel directly machined in the concentric cylindrical female portion with anti-friction bearings interengaging the adjacent opposed longitudinal race surfaces. The telescoping portions are retained together for controlled axial movement and recovery therebetween by elastic means. The bottom of the channel preferably engages the male member thereby providing a substantially full radial support engagement of simple geometry and exceptionally economic manufacture.

20 Claims, 6 Drawing Figures

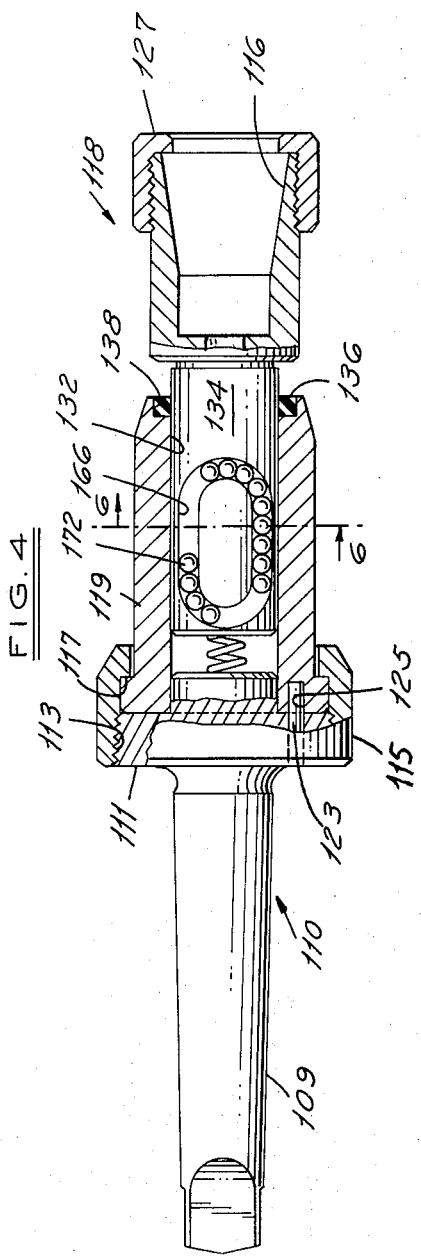
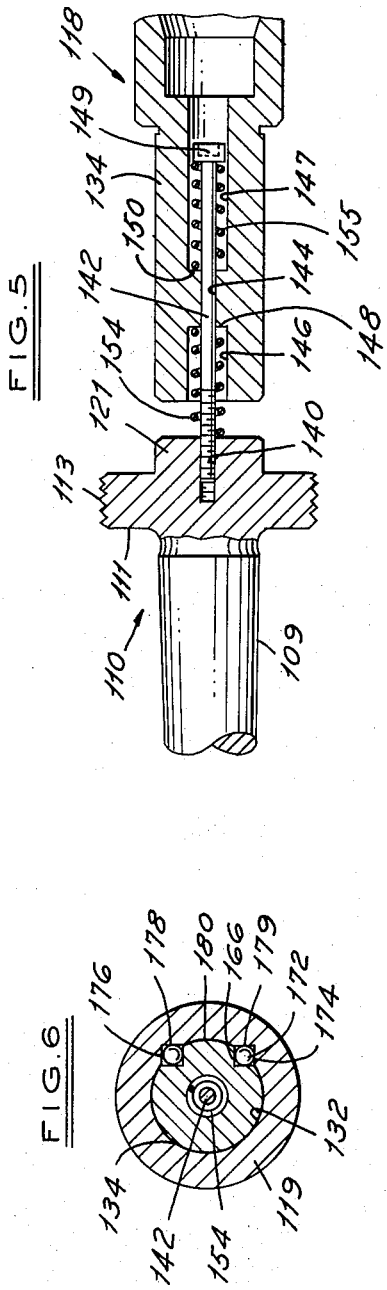

TAP DRIVER

BACKGROUND OF THE INVENTION

Tool holders conventionally used in thread cutting operations include driving and driven members assembled in a manner which allows relative axial movement while transmitting torque. In the absence of precisely coordinated feed of the driving member with the pitch of the tap thread, the assembled tool must provide sufficient axial freedom for the tap to follow only its own lead and at the same time provide sufficient toruqe to do the cutting. Keying means between the driving and driven members must therefore accommodate and transmit the required torque with accurately controlled low resistance to relative axial motion. If there is too much friction in the keying means, the tap will not feed freely at its own pitch and will remove too much material resulting in an improperly formed thread. Such problems often occur where large taps requiring high torque are used.

Prior art tap drivers have utilized a wide variety of devices to minimize friction in the keying means. Most have used free travelling longitudinal bearings of either prepositioned or non-prepositioned type. An example of a tap driver using the non-prepositioned free travelling bearing is shown in U.S. Pat. No. 3,587,124. This device uses a ball which is free to move within a registering slot and groove in order to transmit torque. Because the ball is not held in position with respect to the slot it will not be positioned in the same starting position each time the tool is placed in a machine. When used vertically in a machine, the ball will drop to the bottom of the drive slot and in that position is not free to roll axially during relative axial movement of the driving and driven members.

Examples of tap drivers using prepositioned type free travelling bearings are shown in U.S. Pat. Nos. 2,772,094 and 3,325,837. These devices use an axial ball bushing means to facilitate axial movement and position the drive balls relative to the driving and driven members. The use of such bushing means requires corresponding greater tool length to accommodate a given amount of axial travel and a significant unsupported longitudinal area around the driven member with loss of radial rigidity which in turn limits the torque capacity of the tool.

SUMMARY OF THE INVENTION

The present invention involves the use of recirculating anti-friction bearings preferably roller as a keying means between the driving and driven members of a tap driver. While recirculating bearings as shown in U.S. Pat. Nos. 1,918,108, 2,979,147, and 2,981,570 have been employed for other purposes, the combination of the present recirculating bearing with resilient relative positioning means in axially compensating tap drivers according to the present invention has resulted in surprising and unexpected extensions of the capability of such tooling. For example, a tap driver constructed according to the invention has been successfully experimentally tested with a 1½-6- NC tap at feed rates equal to and slower than the established feed rate for the tap. Feed rates as slow as 7 NC were used. No binding or adverse effects were noted despite extremely adverse operating conditions. The tap driver was similarly used to tap a 3 inch hole at the 7 NC feed rate with no adverse results on the threaded surface. In three further tests the tap was removed from the cut, rotated in the holder 90°, 180°, and 270°, and fed back into the same hole whereupon the tap picked up the tapped hole with no damage to the existing threads. The axial position of the tap relative to the holder was also changed in several tests. Nevertheless the tap picked up the previous threads. Therefore, the applicant's tap driver has demonstrated the ability to follow its own lead notwithstanding a differential feed rate. The ability to restart in existing threads and follow its own lead is important because multiple thread cuts for each thread are utilized to obtain good thread surface finish on large thread sizes where relatively large metal removal is required.

The preferred embodiment comprises a driving member adapted to be driven by a machine spindle and a driven member for receiving a tap. The driving and driven members have interengaging telescopic portions. The driven member has an elongated race having straight axially extending sides and semi circular ends machined in its outer cylindrical surface and symmetric about an axial plane. The longitudinally extending portions of the bottom of this groove preferably extend outwardly to the outer cylindrical surface of the inner member. The driving member has a longitudinal channel formed therein. The sides of the channel engage a plurality of roller bearings filling the elongated race and in combination with the outer race provide a complete raceway in which the bearing rollers can recirculate. A resilient spring is provided axially between the driving and driven members to control their relative free axial position and initiate tapping movement. In the test noted above the spring was rated at 11 pounds per inch, 3 inches free length and was preloaded to 2½ inches. The tap driver may be driven clockwise or counter-clockwise as desired with the recirculating bearing means providing torque transmitting engagement with a high degree of axial freedom. In an alternate embodiment balls are substituted for the rollers and dual springs are provided between the driving and driven members.

DESCRIPTION OF THE DRAWINGS

FIG. 4 is a sectional side elevation of an alternate form of the tap driver disclosing the inner configuration;

FIG. 5 is a different sectional side elevation of the tap driver in FIG. 4 with portions removed to disclose other features of the inner configuration; and FIG. 6 is a cross section taken along the line 6—6 of FIG. 4.

DESCRIPTION OF THE PREFERRED EMBODIMENT

Figure 1:
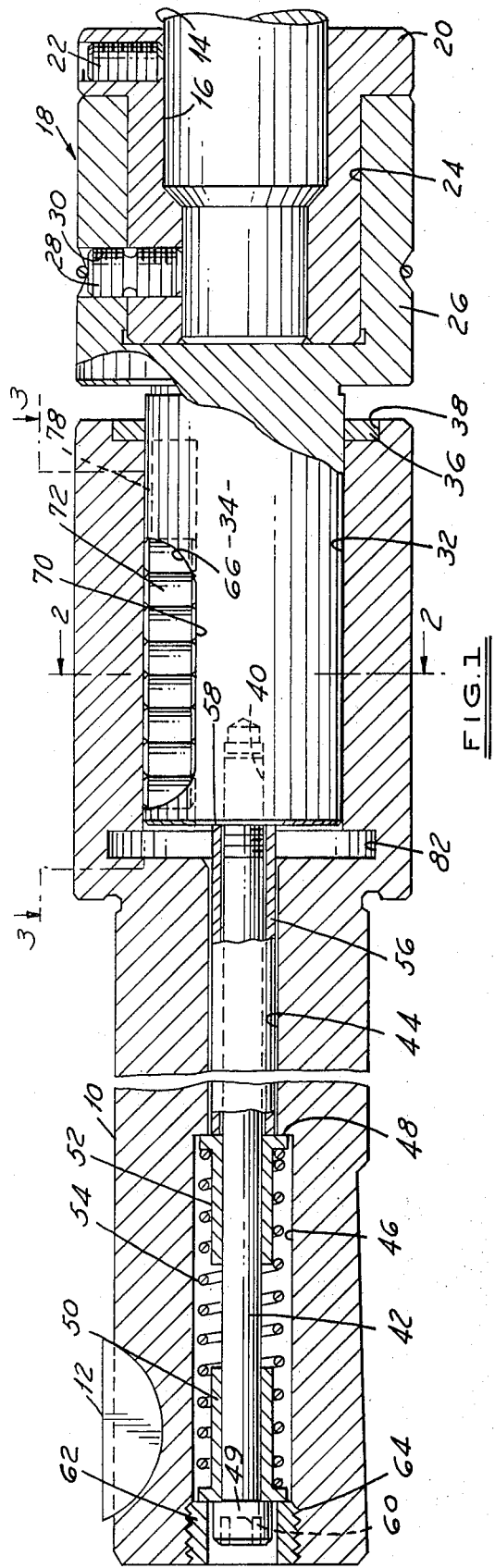
FIG. 1 is a sectional side elevation of the tap driver disclosing the inner configuration.

In FIG. 1, the tap driver comprises a driving member 10 (including a key 12) adapted for insertion in a machine spindle (not shown). At the other end of the tap driver, a tap 14 (shown broken away) is secured in a shouldered bore 16 of a bushing 20 which is in turn secured in a bore 24 of the enlarged head 26 of the driven member generally denoted by 18. One or more set screws 22 retain the tap 14 in the bushing 20. The bushing 20 and head 26 are retained together in driving engagement by a shear pin 28 located in a transverse bore 30 for overload protection.

The driving member 10 includes a concentric bore 32 adapted for retaining the cylindrical engaging portion 34 of the driven member 18 with sufficient freedom for relative axial movement therebetween as is well known in the art. Sealing means 36 are provided in a shouldered bore 38 at the end of the driving member 10 to prevent debris from entering in the telescoping engagement. The cylindrical inner portion 34 includes a concentric threaded bore hole 40 having a shaft 42 threadably engaged therein. The shaft 42 is located in a bore hole 44 in the driving member 10. The bore hole 44 communicates with an enlarged bore hole 46 providing a concentric shoulder at 48. Mounted on the shaft 42 are twin, opposed, shouldered spring retaining bushings 50 and 52, having a compression spring 54 located therebetween. Different springs with a variety of spring rates may be inserted to vary the spring force during telescopic extension of the driven member 18. The bushing 52 seats against the shoulder 48. Seated against the bushing 52, located on the shaft 42 and inside the bore 44 is a sleeve 56 which engages at 58 the driven member 18. The bushing 50 seats against the head 49 of the shaft 42. Thus the spring 54 compresses as the driven member 18 is moved axially outward. The relaxed position of the part 18 may be adjusted by the use of an Allen Head wrench in the socket 60 provided in the head 49 of the shaft 42. A threaded ring 62 having a hexagonal bore is threaded into the bore 46 at 64 and provides the stop for the bushing 50 when the driven member 18 is in normal retracted position. However, freedom for further leftward movement or compression during initial contact of the tap with the work piece is provided by movement of the sleeve 56 leftwardly against the bushing 52. The ring 62 includes inner clearance as shown for the head 49 while retaining the bushing 50.

Figure 2:
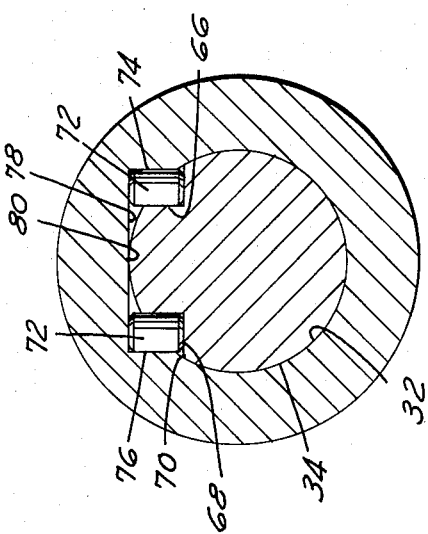
FIG. 2 is a cross section taken along the line 2—2 of FIG. 1.
Figure 3:
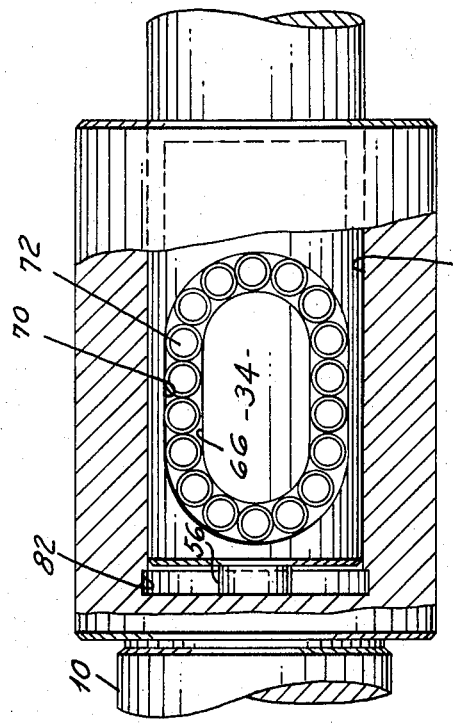
FIG. 3 is a partial cutaway top elevation taken along the line 3—3 of FIG. 1.

FIGS. 1, 2 and 3 disclose the recirculating roller means embodied in the invention. Formed in the cylindrical portion 34 of the driven member 18 is an elongated race 66 with parallel longitudinal sides. The bottom surface 68 of the race 66 intersects the cylindrical portion 34 along the longitudinal portions 70 of the race. A plurality of rollers 72 recirculate in the race 66. The race 66, as is clearly shown in FIGS. 1 and 2, is open to allow the rollers 72 to engage the sides 74 and 76 of the channel 78 formed in the bore 32 of the driving member 10. A portion of the rollers 72 will be in driving engagement with either side 74 or 76 depending upon the direction of rotation of the unit. Upon axial telescoping movement, the rollers will recirculate thus providing a minimal rolling resistance by only those rollers in loaded driving engagement with the remaining rollers freely recirculating under a no-load condition. The channel 78 provides the remaining guidance to complete the recirculating raceway for the rollers 72.

The bottom of the channel 78 is tangential at 80 to the cylindrical portion 34 of the driven member 18 and assures additional transverse rigidity. This particular configuration provides complete containment of the rollers 72 and allows for extremely simple manufacture. After the bore 32 is provided in the driving member 10, a channel 78 may be cut into the wall of the bore 32. Likewise, after the cylindrical portion 34 is provided on the driven member 18, the race 66 may be easily milled into the surface. Prior to the cutting the channel and race, both surfaces of the telescoping engagement are cylindrical thereby providing ease of manufacture since no other keying means need be provided in addition to the bearing means. It will be noted in this connection with reference to FIG. 2 that an angular relationship of the two races in the order of one quadrant is required to provide adequate directly opposed parallel race walls in the respective telescoping members without any race extension beyond the cylindrical surface of either member. Other forming means may be readily utilized as alternate methods to manufacture the channel and race. An undercut relief bore 82 is provided for end travel of a tool in manufacturing the channel 78. The configuration provides for proper radial accuracy of the telescoping engagement and eliminates the need for a roller cage or other supplementary guide means for the rollers. Although the preferred embodiment utilizes a female driving member and male driven member they may be reversed as desired.

An alternate embodiment of the tap driver is shown in FIGS. 4, 5 and 6. Elements similar to those in FIGS. 1 through 3 are numbered accordingly with the prefix 1 added. The driving member generally denoted by 110 includes a shank 109 with a flange 111 having a threaded periphery 113. Engaging the thread 113 is an annular nut 115. The nut 115 engages a flange 117 on the drive portion 119 of the driving member 110. The nut 115 retains the flange 111 in tight engagement with the portion 119. Concentricity is assured by the stub 121 extending from the flange 111 into the bore hole 132 of the portion 119. To complete the assembly of the driving member 110 a drive key comprising a pin 123 is tightly inserted in a bore hole 125 extending through the flange 111 and into the portion 119, as shown. This configuration allows interchangeability of the shank 109 of the tap driver to meet a variety of manufacturers spindle requirements. An external seal 136 inserted in a counterbore 138 completes the driving member 110 assembly.

The driven member generally denoted by 118 includes a substantially conical bore 116 and a collet nose nut 127 for closing a collet (not shown) which retains the tap (not shown). The inner cylindrical portion 134 of the driven member 118 is adapted for running fit retention in the concentric bore 132 of the drive portion 119 with sufficient freedom for the axial relative movement required in tap driving. In a manner similar to that above, a longitudinally extending race 166 is formed in the surface of the inner cylindrical member 134. In this embodiment however the rolling means comprise balls 172. Along the longitudinal portions of the race the balls are adapted to engage the sides 174 and 176 of twin grooves 178 and 179 formed in the bore hole 132 of the drive portion 119. The grooves 178 and 179 perform a similar function to the channel 78 of FIGS. 1 through 3. However, there is arcuate running fit engagement at 180 between the bore hole 132 and inner member 134.

As is more clearly shown in FIG. 5, two compression springs 154 and 155 are located in counterbores 146 and 147 of a bore hole 144 extending through the inner member 134. An adjustable screw 142 extends through the bore hole 144 and the two springs 154 and 155. The screw 142 is threadably engaged in the stub 121 of the driving member 110 at 140. The spring 154 engages the stub 121 and shoulder 148 to permit controlled further retraction from the neutral position to assure proper initial engagement. The other spring 155, which engages the head 149 and the other shoulder 150, allows for adjustable axial extension of the driven member 118. Since both springs 154 and 155 are adjusted by the same screw 142 the spring rate for retraction or extension from the neutral position will be the algebraic sum of the individual spring rates. The spring rate for both retraction and extension may be adjusted merely by inserting the proper springs for the differential spring rate desired.

I claim:

1. A tap driver, comprising; a driving member, a driven member axially aligned and formed with concentric cylindrical guide surfaces for telescoping engagement therewith, elastic means provided between said members adapted to permit controlled relative axial movement therebetween, said telescoping engagement including axially extending longitudinal channel means formed in one of said driving and driven members, an endless race formed in the other of said members having parallel longitudinal race paths adapted to register with said channel means, and recirculating bearing means located in said race with a portion of said bearing means adapted for driving engagement with one side of said channel, said race and channel means being respectively formed entirely by eliminating stock radially outside of the cylindrical guide surface of the external member and radially within the cylindrical guide surface of the internal member, said registering race paths and channel means forming composite bearing races having substantially parallel bearing walls extending substantially normal to the plane of said endless race, and terminating at said guide surfaces, said race paths having an angular separation in the order of one quadrant sufficient to provide adequate directly opposed bearing walls within the confines of said cylindrical guide surface of the internal member.

2. The tap driver of claim 1 wherein said endless race is elongated.

3. The tap driver of claim 2 wherein the bottom of said channel means is tangential to said cylindrical guide surfaces.

4. The tap driver of claim 2 wherein the sides of said channel are parallel.

5. The tap driver of claim 2 wherein the axes of said bearing means are parallel.

6. The tap driver of claim 2 wherein a portion of the bottom of said channel means extends to the associated cylindrical guide surface.

7. The tap driver of claim 2 wherein said elastic means comprises spring means.

8. The tap driver of claim 7 wherein said driven member includes a shaft axially extending within said spring means and having a shoulder in engagement therewith, and wherein a bore hole in said driving member is located concentrically about said spring means and includes a second shoulder in opposed engagement with said spring means.

9. The tap driver of claim 7 wherein said driving member includes a shaft axially extending within said spring means and having a shoulder in engagement therewith, and wherein a bore hole in said driven member is located concentrically about said spring means and includes a shoulder in opposed engagement with said spring means.

10. The tap driver of claim 7 wherein said spring means comprise dual springs having unequal spring rates.

11. The tap driver of claim 2 wherein said bearing means include a plurality of rollers.

12. The tap driver of claim 2 wherein said bearing means include a plurality of balls.

13. The tap driver of claim 1 wherein said driving member includes connection means and a separable shank adapted for replacement by any one of a variety of shanks suited for use in a variety of machine spindles.

14. The tap driver of claim 6 wherein said portion of the bottom of said race extending to the guide surface lies straight and parallel to the common axis of said telescoping members.

15. A telescopically extensible rotary drive shaft comprising;
an outer member having a longitudinal right circular cylindrical opening therein, a cylindrical inner member concentric with said outer member and formed for guided telescoping engagement within said longitudinal opening, axially extending longitudinal channel means formed in the inner surface of said longitudinal opening,
an endless race formed in the outer surface of said inner member, having parallel longitudinal race paths adapted to register with said channel means; and,
recirculating bearing means located in said race with a portion of said bearing means adapted for driving engagement with one side of said channel,
said race and channel means being respectively formed entirely by eliminating stock radially outside of the cylindrical guide surface of the external member and radially within the cylindrical guide surface of the internal member, said registering race paths and channel means forming composite bearing races having substantially parallel bearing walls extending substantially normal to the plane of said endless race, and terminating at said guide surfaces, said race paths having an angular separation in the order of one quadrant sufficient to provide adequate directly opposed bearing walls within the confines of said cylindrical guide surface of the internal member.

16. The telescopically extensible rotary drive shaft of claim 15 wherein the bottom of said channel means is tangential to said outer surface of said inner member.

17. The telescopically extensible rotary drive shaft of claim 15 wherein a portion of the bottom of said race extends to the outer surface of said inner member.

18. The telescopically extensible rotary drive shaft of claim 17 wherein said portion of the bottom of said race is straight and parallel to the common axis of said guided telescoping members.

19. The tap driver of claim 1 wherein only a single endless race is employed and the guide surfaces opposite said race extend substantially around the remaining three quadrants.

20. The tap driver of claim 1 wherein said composite bearing races are substantially rectangular in cross section.

* * * * *